United States Patent
Challener et al.

(10) Patent No.: US 8,495,728 B2
(45) Date of Patent: Jul. 23, 2013

(54) INTERNET APPLIANCE INTEGRATING TELEPHONE FUNCTION SECURITY AND GUIDANCE FEATURES

(75) Inventors: David Carroll Challener, Raleigh, NC (US); Peter Alexander Manson, Cary, NC (US); Douglas Morgan Trent, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 4256 days.

(21) Appl. No.: 09/758,927

(22) Filed: Jan. 11, 2001

(65) Prior Publication Data

US 2002/0091941 A1    Jul. 11, 2002

(51) Int. Cl.
*G06F 7/04* (2006.01)

(52) U.S. Cl.
USPC .................................. 726/17; 726/18; 726/21

(58) Field of Classification Search
USPC ....................................... 713/201, 200; 726/4
See application file for complete search history.

(56) References Cited

U.S. PATENT DOCUMENTS

| | | | | |
|---|---|---|---|---|
| 5,280,527 A * | 1/1994 | Gullman et al. | ............... | 713/184 |
| 5,901,214 A | 5/1999 | Shaffer et al. | ................. | 379/220 |
| 5,916,302 A | 6/1999 | Dunn et al. | .................... | 709/204 |
| 5,917,817 A | 6/1999 | Dunn et al. | .................... | 370/352 |
| 5,956,482 A | 9/1999 | Agraharam et al. | ...... | 395/200.33 |
| 6,012,144 A | 1/2000 | Pickett | ........................... | 713/201 |
| 6,137,869 A * | 10/2000 | Voit et al. | ................. | 379/114.01 |
| 6,272,629 B1 * | 8/2001 | Stewart | .............................. | 713/2 |
| 6,282,275 B1 * | 8/2001 | Gurbani et al. | .......... | 379/142.06 |
| 6,430,275 B1 * | 8/2002 | Voit et al. | ................. | 379/114.17 |
| 6,678,359 B1 * | 1/2004 | Gallick | ....................... | 379/88.17 |
| 6,757,823 B1 * | 6/2004 | Rao et al. | ...................... | 713/153 |

FOREIGN PATENT DOCUMENTS

WO      WO 99/16218      4/1999

* cited by examiner

*Primary Examiner* — Kaveh Abrishamkar
(74) *Attorney, Agent, or Firm* — Winstead, P.C.

(57) ABSTRACT

An Internet appliance has added hardware and software functionality to allow communication where a dialing action request is authorization is verified using a personal identification means (PIM). A user first selects a communication access number by requesting a dialing action on a actual or a virtual keypad or by clicking a "hot spot" on a Web page. Selecting an access number (e.g., dialing of a telephone number), alerts the user of the Internet appliance of the selection process whether the user instigates or the selection is attempted from a remote device using the Internet appliance facilities. Either method will trigger software commands that prompt the user to enter a PIM either to authorize his own use or another one's use of the Internet appliance. The PIM may comprise, but is not limited to, keying in a personal identification number (PIN), a biometric identification, or a smart card stored number. The PIM is correlated to an authorization means that verifies that the user so identified is authorized to make or allow the prescribed connection. The Internet appliance has a security protocol that is used to encrypt and decrypt the PIM data. Also the device drivers used to execute a dialing action are also encrypted by the security protocol and are only decrypted on granting of authorized use of the Internet appliance. If the user so requests and is authorized, they may also select to use the security protocol to execute secure communication. The security protocol includes but is not limited to a Public/Private symmetric key technology.

41 Claims, 6 Drawing Sheets

INTERNET APPLIANCE INTEGRATING TELEPHONE FUNCTION SECURITY AND GUIDANCE FEATURES

TECHNICAL FIELD

The present invention relates in general to a method and system for integrating a telephone function within an Internet appliance, in particular to integrating a telephone function with security and guidance features.

BACKGROUND INFORMATION

The two-way transmission of audio over an Internet protocol (IP) network is referred to as IP telephony. When used in a private Intranet or wide area network (WAN), it is generally known as "voice over IP", or sometimes "VoIP". When the public Internet is the transport vehicle, it is referred to as "Internet telephony," however, both terms are used synonymously.

Private networks are able to provide from good to excellent quality for voice transmission, matching that of the public switched telephone network (PSTN). Over the Internet, voice quality varies considerably; however, protocols that support quality of service (QoS) are expected to improve this condition. Nevertheless, Internet telephony means free voice calls as long as sending and receiving users have identical software that uses proprietary techniques or compatible software that uses the H.323 standard. They must also be willing to talk from the personal computers (PCs) and to prearrange the times to talk. When users go online and launch their IP telephony client software, the session and current IP address is registered on a directory server on the Internet so that others may contact them.

Using Internet telephony service providers (ITSPs), users can make PC-to-phone or phone-to-phone calls, using the Internet as the network backbone. ITSPs have been initially popular for international calls. Another IP telephony application is one where call centers can answer a question directly from a Web site. This voice integration is desired by user and vendor alike and is expected to flourish in the future. The IP protocol is either being used or being considered for future network backbones by all major telecommunications carriers.

An Internet appliance is also sometimes called an "information appliance", a "smart appliance", and a "Web appliance". An Internet appliance is a device specialized for accessing e-mail and/or other data from the Web. Designed for simplicity, the Internet appliance either plugs into a telephone jack, cable jack, or uses a wireless connection to the Internet. Internet television (TV) services (e.g., WebTV) are also sometimes called Internet appliances. However, Internet TV services are designed for stationary use in the home, whereas an Internet appliance is typically very portable. Internet appliances exist which combine telephone and browser functions. These Internet appliances may include voice-over-IP telephony function with methods for initiating a call from a web page "hot spot". A web page hot spot is an icon or part of a larger image used as a hyperlink to another document or file. When the hot spot is clicked, the linked material is searched for and displayed. A hot spot may be part of a larger image. For example, an image may have several hot spots, one for each of its components. When clicked, a greater explanation of the component is produced. Where hot spots begin and end determines how easy they are to select.

Prior art Internet appliances, however, lack functionality to assure that the phone/browser appliance owner (person who "owns" the Internet appliance) is indeed the initiator of a call. This leaves the Internet appliance and the service open to identity-faking attacks which may result in unauthorized phone calls from the Internet appliance. If unauthorized phone calls occur over normal PSTN services, there could be considerable financial impact to the user and service provider. There also is no Internet appliance function to deal with incoming calls based upon origin of the call. Another deficiency with prior art Internet appliances, which provide telephony service, is that there is no way of ensuring that voice over IP telephony occurs between authorized nodes, especially in a Dynamic Host Configuration Protocol (DHCP) environment. In fact, it is difficult to identify users for voice over IP telephony in a DHCP environment where IP addressing is not static.

Therefore there is a need for an Internet appliance that integrates telephone with security and guidance features.

SUMMARY OF THE INVENTION

An Internet appliance has a variety of physical connections to the Internet or a PSTN. These physical connections may comprise a non-concurrent shared PSTN and Internet connection, two separate PSTN lines, or a single high speed line (e.g., DSL or cable modem) for concurrent communication of telephone and Internet information using a single communication line. Software and hardware provide telephone functionality so that a user may select a communication access number by a dialing action or by clicking a hot spot on a Web page. The Internet appliance alerts the user when a dialing action is requested (e.g., dialing a telephone number) so the user is aware even if a remote device is trying to access an access number using their Internet appliance facilities (e.g., make an unauthorized call). No matter how the communication access number is selected, the Internet appliance prompts the user to use one of a number of possible personal identification (authorization) means for identifying a user authorizing a use of the Internet appliance. These methods comprise, but are not limited to, smart card, PIN number entry, voice pattern recognition, or biometric data entry. The Internet appliance has a security protocol that is used to encrypt and decrypt the personal identification data. Also, the device drivers used to execute a dialing action are encrypted by the security protocol and are only decrypted on granting of authorized use of the Internet appliance. The Internet appliance also displays a connectivity cost alert based on the access number selected. The connectivity cost alert may include any known toll cost or just an alert that the selected access number (e.g., 1-900 calls) will bill a toll if completed. The user may abort an authorized access after viewing the connectivity cost alert. Once a user has been authorized for the communication access number, the user may also use the security protocol to send information over a communication link. Other embodiments of the present invention allow the user to use a built-in escrow key function to notify a trusted server of the user's current DHCP assigned IP address along with a key indicating authenticity of transmission so that voice over IP services between devices and web page server lookup may be performed in a DHCP environment without side-channel communication for call or web reference lookup. Other embodiments of the present invention monitor incoming communication access source numbers to allow routing the incoming call to a user, an answering machine or other messaging or receiving device.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
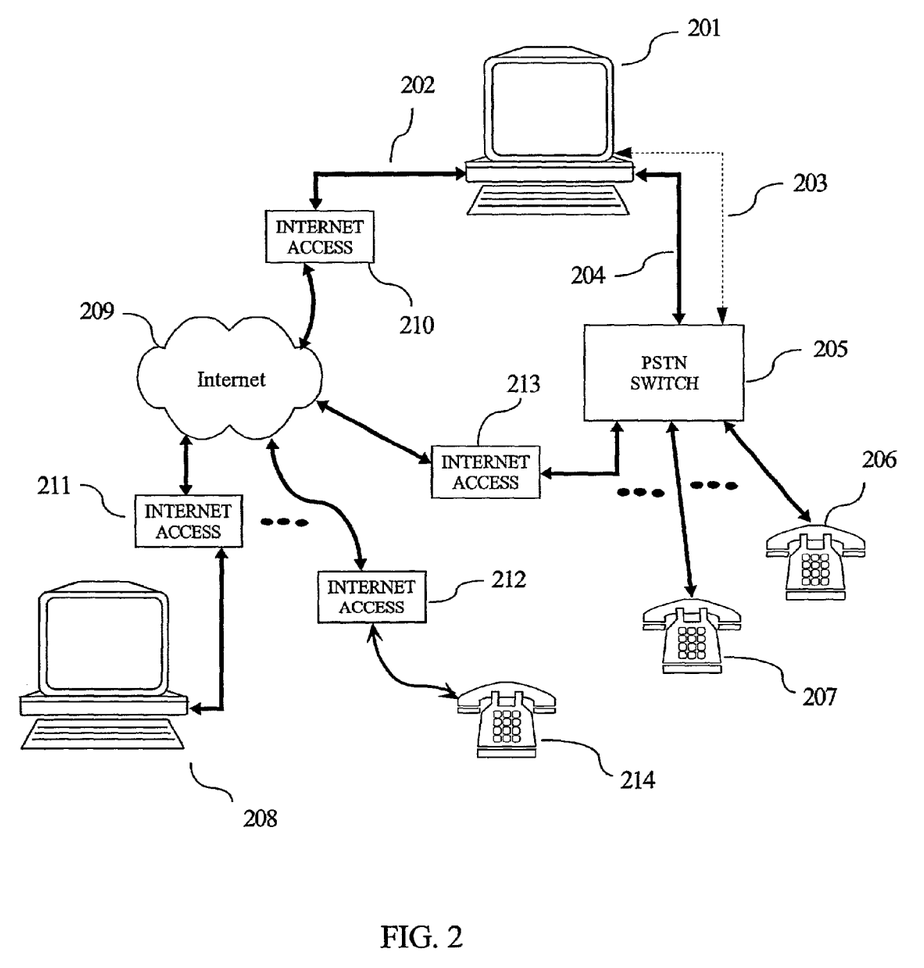
FIG. 2 is a block diagram of communication links according to embodiments of the present invention.

FIG. 2 illustrates a communication network according to embodiments of the present invention. An Internet appliance (IA) 201 is in the form of a display, a system unit and a keyboard entry device. IA 201 may have a dedicated Internet communication link 202 or a single telephone connection 204 or a second telephone connection 203. A dedicated Internet communication link 202 may be a broadband (e.g., cable, DSL, or other method) connection to the Internet 209. A single telephone (PSTN) connection 204 may use a digital subscriber line (DSL) hook up where telephone connection and an Internet connection may be made and maintained over a single copper line. Alternatively, single telephone connection 204 may be used for PSTN connections and a separate telephone line 203 may be used for simultaneous Internet connection. A PSTN switch 205 enables connections to telephones (e.g., 206 and 207) as well as connection to the Internet 209 (e.g., via an Internet access 213) or to a telephone 214 via Internet access 212 and 213). Telephone connections may be made from an IA 201 to another IA 208 via a direct Internet connection 202 through the Internet 209 and Internet access 211. In this manner, telephone connections may be made using standard PSTN protocol or via the Internet using Internet protocols. Embodiments of the present invention are designed to prevent a "stealth" or "hack" user from one IA (e.g., IA 208) from accessing another IA (e.g., IA 201) and using the facilities of IA 201 to place an unauthorized toll call. The unauthorized user would cause the owner of IA 201 to pay for a toll call that the owner did not make. Using embodiments of the present invention, the user of IA 201 would be alerted whenever a dialing action via IA 201 facilities was being requested. These requests would require the user of IA 201 to authorize the dialing action (using a personal identification means (PIM)) and subsequent connection before the dialing action would be initiated. Since authorization may be encrypted, a hacker would be further prevented from gaining access to communication via an unauthorized ICA.

The following describes a built-in key escrow function used in embodiments of the present invention. When a user first receives and sets up his Internet appliance he uses a provided utility and security protocol to create (in a secure manner known to a knowledgeable practitioner) a Public/Private key pair. This becomes a device (Internet appliance) Public/Private key pair for further system operations requiring security. The device Private key is written into a secure hardware security processor component in the IA so that it is improbable or extremely difficult to obtain the Private key by physical dis-assembly or electronic/software attack of the device. The device Private key is made available within the IA by conventionally storing it in a memory unit as one would any other data item. The user now creates a user password (or PIM) and a separate user Public/Private key pair. The user encrypts the user PIM and the user Public/Private key combination using the device Private key. The encrypted user PIM and Private key are stored within the IA. As a result of this process, the user and the IA now have a unique identification. In general, to prove that a message or communication originates from the authorized user on the unique device, the message or communication is sent to the hardware security processor to be encrypted with the user Private key.

The user Private key is not immediately accessible, so it must first be decrypted from the encrypted user password/Private key element using the device Private key within the processor. The user now has the decrypted user Private key and user password. The security processor now compares the decrypted user password with a new one requested at this time (Internet appliance signals for user authorization in the form of a password). If the stored and entered passwords or authorization means match, the user Private key may now be used to "sign" the message by encrypting the message with this key. The encrypted message may now be encrypted by the widely available user Public key to authenticate the originator of the message.

Figure 5:
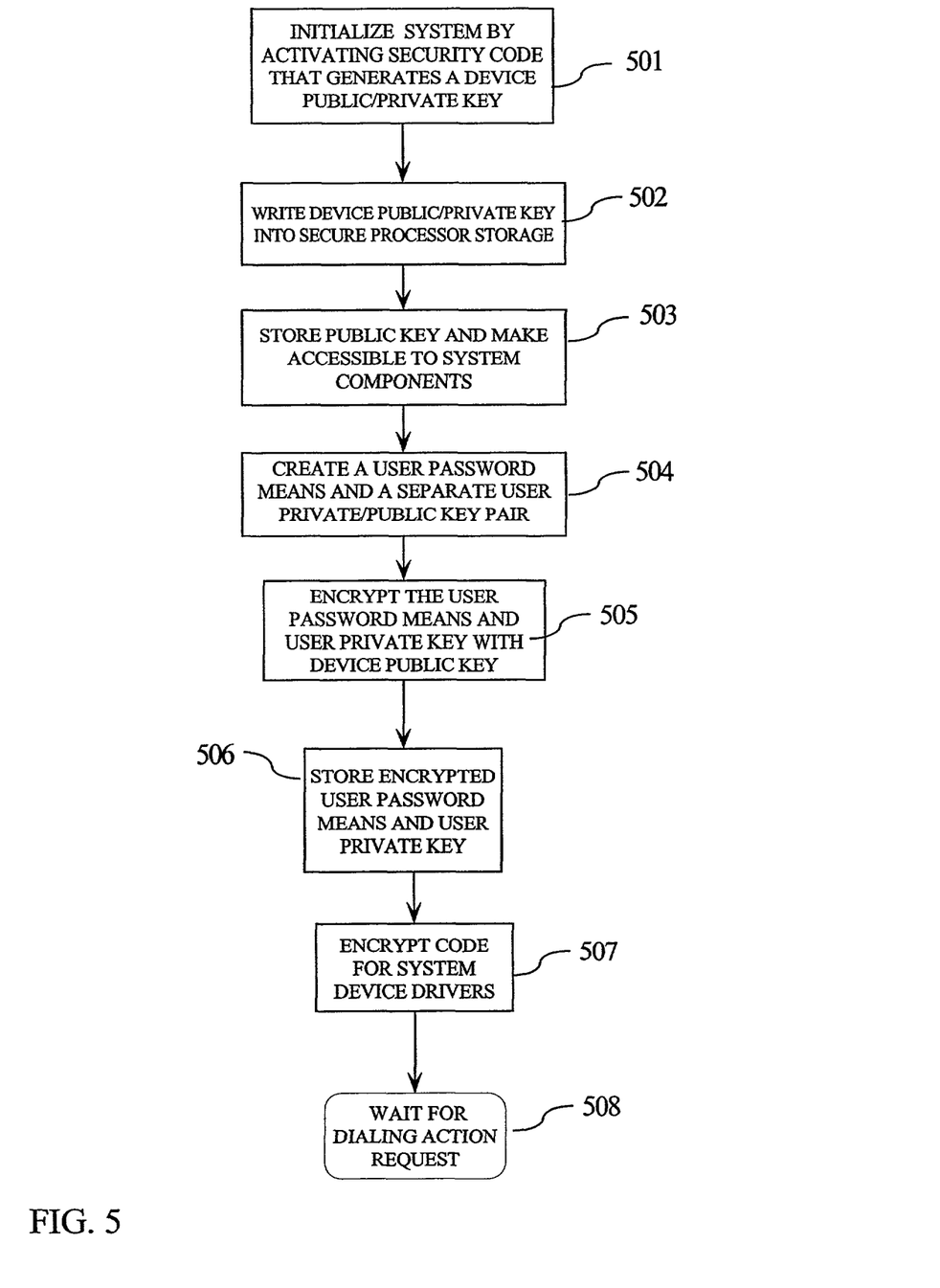
FIG. 5 is a flow diagram of method steps for initializing an Internet appliance according to embodiments of the present invention.

FIG. 5 illustrates method steps used to initialize a Internet appliance according to embodiments of the present invention. In step 501, security code including a security protocol is activated which generates a device (Internet appliance) Public/Private key. In step 502, the generated Public/Private key is stored into a storage unit in a secure processor. The device Public key that was generated in step 502 is stored into a location accessible by system components in step 503. User password or personal identification means (PIM) (e.g., biometric data, or a literal password) and a user Public/Private key are created in step 504. In step 505, the user PIM and the user Private key are encrypted with the device Public key. In step 506, the encrypted user PIM and the user Private key are stored. In step 507, the system device drivers used to execute dialing actions are encrypted and stored. In step 508, the Internet appliance awaits a dialing action request.

Figure 1:
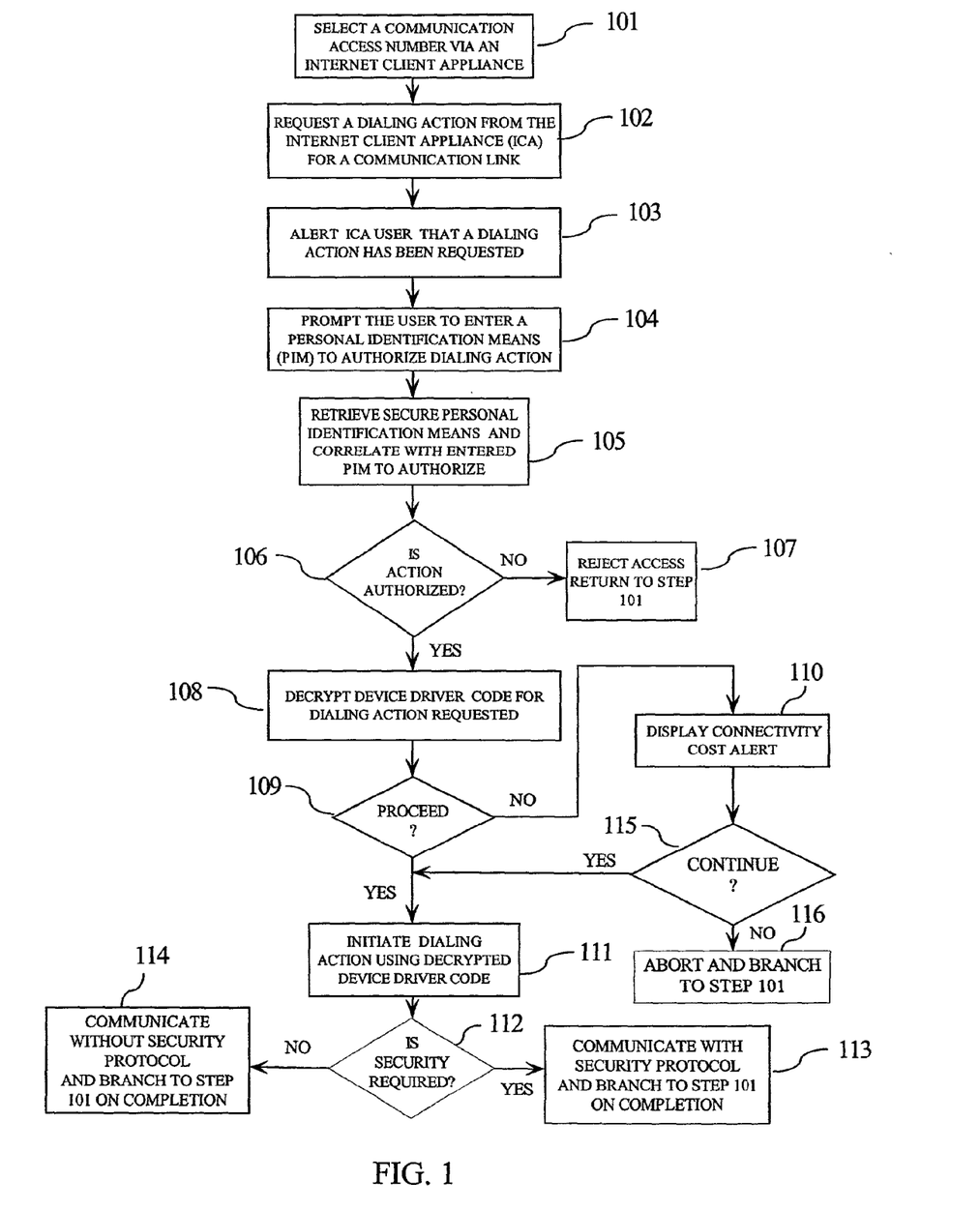
FIG. 1 is a flow diagram of method steps according to embodiments of the present invention.

FIG. 1 is a flow diagram of method steps in embodiments of the present invention. In step 101, a user selects a communication access number. Selecting a communication number may range from dialing a number using a key pad or a virtual keyboard on display 302 to clicking on a hot spot on an Internet web page. Entering a number in response to a dial tone or clicking on an Internet hot spot in effect requests, to an underling control mechanism, a communication link access using the requested access number. In step 102, the dialing action is requested from the ICA. In step 103, the user is alerted that a dialing action is requested via his IA facilities. In step 104, the user is prompted to enter a personal identification means (PIM) to authorize the dialing action whether the user initiates or the initiation is done remote from the ICA. According to embodiments of the present invention, the user is required to authorize any dialing request on the ICA. This also alerts the user when someone is trying to use the IA communication facilities. In step 105, the entered PIM is correlated with a retrieved decrypted PIM to authorize the requested communication link. In step 106, a test is done to determine whether the access (dialing action) is authorized. If the result of the test in step 106 is NO, then the access is rejected in step 107 and a return is initiated to step 101 awaiting selection of another communication access number. If the result of the test in step 106 is YES, then a corresponding device driver code is decrypted in step 108. The connectivity cost alert tells the user that a toll communication is about to take place. This may be in the form of an actual toll call rate, alerting that the call is a foreign or long distance call, or the fact that a 1-900 or like communication has been requested. The user may determine in response to the connectivity cost alert whether to proceed with the authorization. In step 109, a test is done to determine whether to proceed with the dialing action using the decrypted device drive code. If the result of the test in step 109 is NO, then in step 110 a connectivity cost alert is displayed to the user of the IA. A test is executed in step 115 to determine whether to continue based on a user response to the connectivity cost alert in step 110. If the result of the test in step 115 is NO, then the dialing action is aborted in step 116 and a return is executed to step 101 awaiting another communication access number. If the result of the test in step 115 is YES or the result of the test in step 109 is YES, then the dialing action is initiated in step 111. In step 112, a test is made to determine if the connection requested by the dialing action requires security protocol. If the result of the test in step 112 is NO, then in step 114 communication is done without security protocol and when completed a return is executed to step 101 awaiting another communication access number. If the result of the test in step 112 is YES, then in step 113 communication is done with security protocol and a branch to step 101 is executed on completion.

Figure 3:
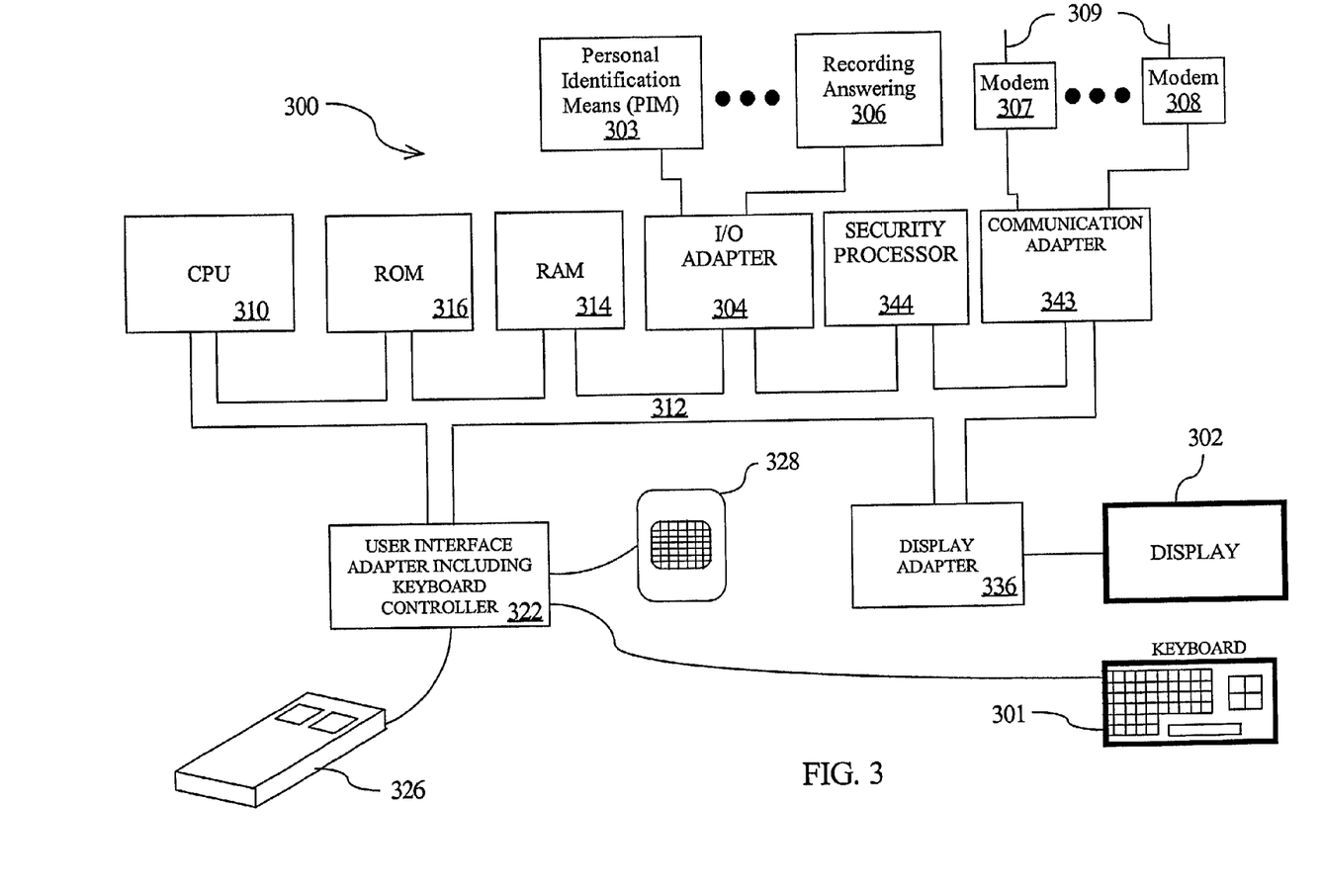
FIG. 3 is a system level diagram illustrating Internet appliance units.

FIG. 3 is a system level diagram of an Internet appliance (IA) 300 according to embodiments of the present invention. Typically an IA 300 has many of the functional units of a personal computer (PC) but lacks the adaptability for adding a variety of storage units or other functional circuit cards. According to embodiments of the present invention, the IA 300 may have a central processing unit (CPU) 310 coupled to read only memory (ROM) 316 and random access memory (RAM) 314 via a system bus 312. A user interface 322 is used to couple a mouse 326, keyboard 301, a microphone 345 and a speaker 328. The user may use these devices to interface to and operate the IA 300. A display adapter 336 is used to couple display output data to a display 302. Since the IA 300 is used primarily to communicate via the Internet, the communication adapter 343 is a key component. Communication adapter 343 may house key circuits employed in embodiments of the present invention and provides interfaces with Modems (e.g., 307 and 308) which condition signals to communicate over lines 309. Lines 309 may comprise Cable connections, PSTN connections, DSL connections or possibly wireless (cellular, PCS or satellite) connections. Input/Output (I/O) adapter 304 is used to couple various PIMs (e.g., PIM 303) or a recording or answering device 306. A security processor 344 incorporating security protocol code and tamper proof storage is also coupled to bus 312. Security processor 344 is used for initializing the system and encrypting and decrypting PIMs and communication information.

Figure 4:
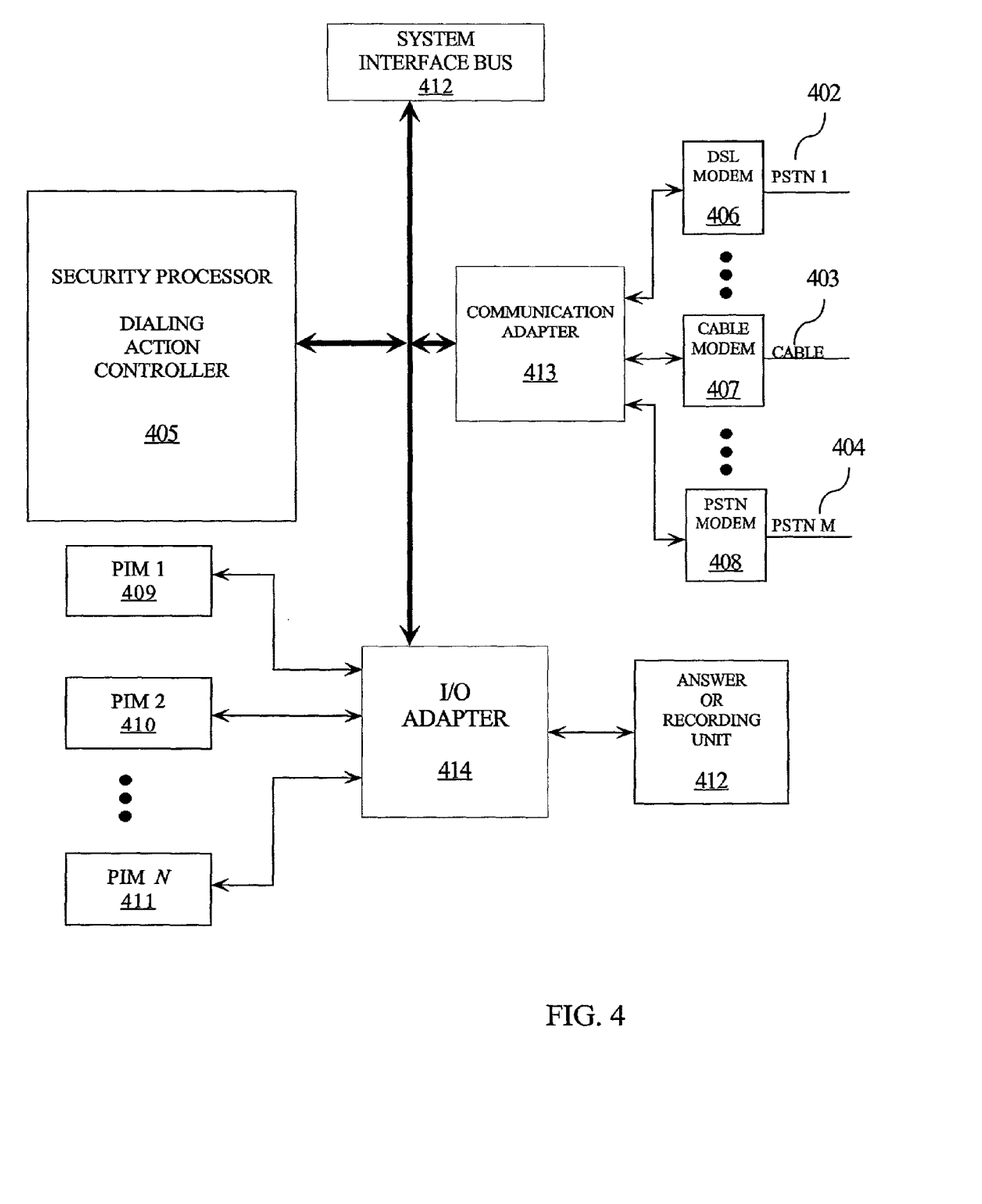
FIG. 4 is a block diagram of system components used in embodiments of the present invention.

FIG. 4 is more detailed diagram of circuits in embodiments of the present invention. A user (remote or local) may request a dialing action by entering a communication access number (e.g., a telephone number). This may be done by entering numbers on a keyboard 301, on a virtual dial pad on a display screen 302, voice recognition input (not shown) or by clicking a "hot spot" on display screen 302. The dialing action request would couple to dialing action controller (DAC) 405 via system interface 412. The DAC 405 would then signal to' the user to input an authorization which may be entered via PIMs 409, 410 or 411. The device driver that actually does the dialing action is not stored in useable form within the IA, rather, the device driver (or necessary portions of the driver) are encrypted, using the security protocol, and stored as non-functional code. For example, the device driver code may be exclusively-ORed with a random pattern and this non-functional code may be then stored in the IA memory. The random pattern is a signed static message (or portion thereof) generated by a security protocol (e.g. the Public/Private key method explained above). In order to restore function, the device driver it must again be exclusively-ORed with the same random patter, which must be regenerated from a PIM prompt in the manner described above. The now functional device driver code may now be used to perform the dialing action. This method protects the code and therefore the dialing action in a manner that is not subject to brute force attack, due to the long length (typically 1024 bits) used in the Public/Private key crypto-system. Embodiments of the present invention employ a hardware security processor in the device to protect the Private keys and to do the Public/Private key cryptographic functions. Other embodiments may use software to implement the same mechanism with less protection for the Private keys. Embodiments of the present invention may obtain the PIM as described above using a hash of biometric data (e.g., fingerprint, retinal scan, etc.).

The entered PIM is then compared with a previously stored PIM (e.g., in RAM 314) within the security processor system. If the access is authorized, then the DAC 405 sends appropriate signals over a Modem 406, 407 or 408 to establish a communication link. Incoming calls (with corresponding source numbers) received via Modems 406, 407 or 408 may be compared to stored numbers. These stored numbers may have been assigned responses such as; playing a pre-recorded message, recording the call (using answering or recording unit 412), or directing the call to another party via DAC 405 and the IA 300. DAC 405 may also send a connection cost alert to a user (e.g., display on 302) after an access has been authorized giving the user another option to either complete the connection or abort the dialing action request. The DAC 405, via the system interface 412, may also employ security encryption for communication on an established link. For Internet telephony, a user may use a built-in key escrow function (e.g.,using the method previously described in pg. 10 line 20 to pg. 12 line 4) to notify a trusted server of a current Dynamic Host Configuration Protocol (DHCP) assigned Internet protocol (IP) address along with a "signature" indicating authenticity of transmission so that voice over IP services between devices and a web page server lookup may be performed in a DHCP environment without side-channel communication for call or web reference look-up.

Figure 6:
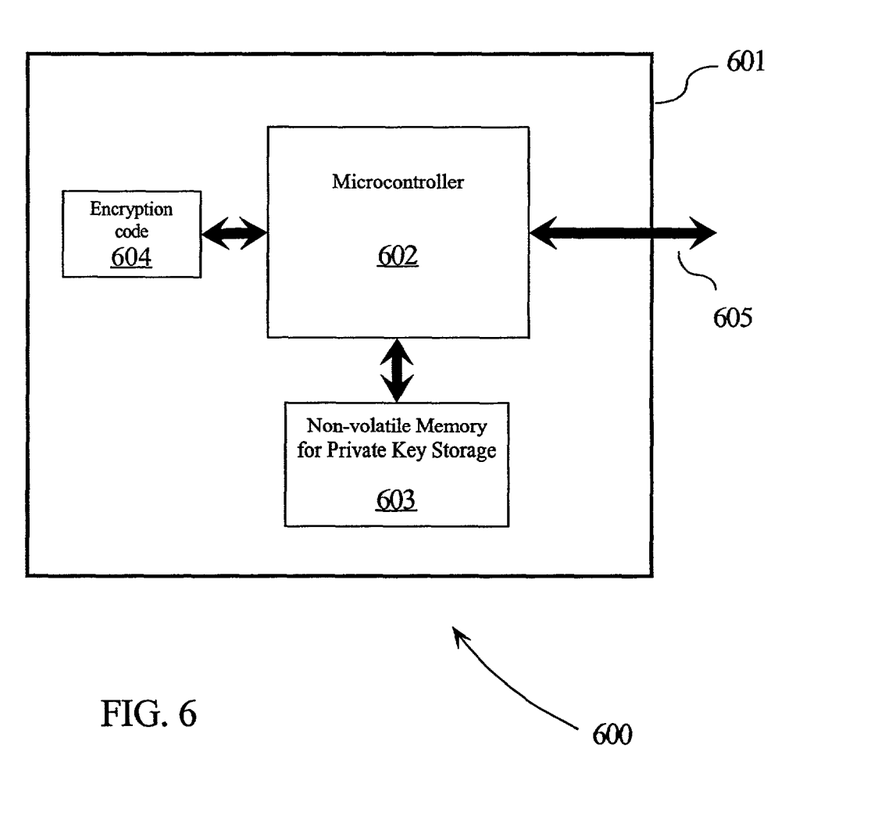
FIG. 6 is a block diagram of a security processor function according to embodiments of the present invention.

FIG. 6 is a block diagram of some elements of a security processor according to embodiments of the present invention. Security processor 600 is contained in a tamper proof area 601 with communication lines 605. Microcontroller 602 is the main processing element of the security processor 600. Encryption code 604 is the software that generates Public/Private keys according to embodiments of the present invention. Non-volatile memory 603 is used for Private key and encrypted data storage that must be maintained if power is lost.

Although the present invention and its advantages have been described in detail, it should be understood that various changes, substitutions and alterations can be made herein without departing from the spirit and scope of the invention as defined by the appended claims.

What is claimed is:

1. A method of integrating telephony function with security and guidance features on an Internet appliance comprising the steps of:
   selecting a communication access number using a selection means, said communication access number operable to access a communication link via said Internet appliance;
   alerting a user of said Internet appliance when an attempt is made to select said communication link via a dialing action of said Internet appliance using said communication access number;
   receiving an authorization for said dialing action by said user of said Internet appliance;
   using a security protocol for encrypting and decrypting information transmitted on said communication link in response to authorizing said dialing action for said communication link; and
   using a built-in key escrow function to notify a trusted server of a current dynamic host configuration protocol (DHCP) assigned IP address along with a key indicating authenticity of transmission so that voice over IP services between devices and a web page server lookup may be performed in a DHCP environment without side-channel communication for call or web reference look-up.

2. The method of claim 1 wherein said authorization comprises the sub steps of:
   prompting said user to enter a user personal identification means (PIM) in response to selecting said communication access number;
   initiating a pre-determined security protocol to retrieve a corresponding secure PIM for comparison;
   correlating said user personal identification means with said secure PIM;
   authorizing or rejecting said dialing action in response to said correlation;
   retrieving secure device driver code for executing said dialing action using said security protocol in response to said authorization;
   displaying, if said dialing action is authorized, a connectivity cost alert for said communication link; and
   executing said dialing action using said device driver code for said communication link in response to said authorization and a user response to said connectivity cost alert.

3. The method of claim 1, wherein said security protocol is a Public/Private key encryption protocol.

4. The method of claim 1, wherein a PIM is used to grant or block access to certain area or country telephony codes.

5. The method of claim 1, further comprising the step of:
   matching said communication access number with an actual system entered communication access number.

6. The method of claim 1, further comprising the steps of:
   monitoring an incoming call for a caller ID; and
   answering and routing said incoming call to a receiving device on the basis of said incoming telephone number.

7. The method of claim 1, wherein activating said selected communication access number comprises selecting said communication access number from a displayed Internet web page hot spot.

8. The method of claim 1, wherein said communication access number is selected using an actual or virtual keypad of said Internet appliance.

9. The method of claim 1, wherein said communication link comprises a non-concurrent shared dial-up public switched telephone network (PSTN) connection between a telephone connection and an Internet connection.

10. The method of claim 1, wherein said communication link has separate connections for an Internet connection and a telephone connection.

11. The method of claim 1, wherein said communication link comprises a concurrent communication link for an Internet and a telephone connection.

12. A system for integrating telephony function with security and guidance features on an Internet appliance (IA):
    one or more personal identification means (PIM) input units coupled to a system bus in an ICA, said PIM input units operable to generate unique PIM signals;
    a security protocol circuit operable to encrypt, decrypt, store and retrieve said PIM signals and device driver code;
    a PIM verification circuit operable to receive said PIM signals and compare them to a secure predetermined PIM signals, said PIM verification circuit generating a verification signal;
    one or more Modems coupled to a dialing action controller and to communication lines; said Modems operable to send and receive communication data;
    a dialing action controller (DAC) coupled to said system bus and said Modems, said DAC operable to receive a dialing action request and to alert a user of said dialing action and to enable or disable said dialing action to said Modems in response to said verification signal and a user signal;
    wherein said DAC uses a built-in key escrow function to notify a trusted server of a current dynamic host configuration protocol (DHCP) assigned IP address along with a key indicating authenticity of transmission so that voice over IP services between devices and a web page server lookup may be performed in a DHCP environment without side-channel communication for call or web reference look-up.

13. The system of claim 12, wherein an authorization unit comprises:
    a smart card reader;
    a biometric input unit;
    a personal identification number input unit; and
    a voice recognition input unit.

14. The system of claim 12, wherein a Modem of said Modems comprises:
    a digital subscriber line (DSL) Modem.

15. The system of claim 12, wherein a Modem of said Modems comprises:
    a wireless cellular modem.

16. The system of claim 12, wherein a Modem of said Modems comprises:
a wireless personal communication system (PCS) modem.

17. The system of claim 12, wherein a Modem of said Modems comprises:
a cable Modem.

18. The system of claim 12, wherein a Modem of said Modems comprises a public subscriber telephone network (PSTN) Modem.

19. The system of claim 12, wherein said DAC alerts said user of a dialing action by display on a user display screen coupled to said IA.

20. The system of claim 12, wherein said DAC retrieves a connectivity cost and alerts said user of a connectivity cost associated with a requested dialing action if said dialing action is authorized.

21. The system of claim 12, wherein said user signal is a response by said user to a connectivity cost alert for said dialing action.

22. The system of claim 12, wherein said user is given an option of communicating on an established communication link in response to an authorized and enabled dialing action using a security protocol.

23. The system of claim 12, wherein said dialing action request comprises:
entering a communication access number via a keyboard keypad, a virtual display keypad, or by clicking a "hot spot" on a Web page.

24. The system of claim 12, wherein said connectivity cost alert notifies a user of an actual toll call cost for a communication link corresponding to said authorized and enabled dialing action.

25. The system of claim 12, wherein said user is alerted of said dialing action whether said dialing action was initiated locally or remote by another user.

26. The system of claim 12, wherein DAC monitors incoming communication access numbers and directs communication to a answering or recording device or forwards the communication to another communication link in response to comparing said incoming communication access numbers to a predetermined, stored communication access numbers list.

27. An Internet appliance, comprising:
a central processing unit (CPU);
a read only memory (RAM);
a random access memory (RAM);
a user interface adapter coupled to a keyboard and a mouse;
a display interface adapter coupled to a user display;
an I/O interface adapter;
a system bus;
a communication adapter; and
a security processing unit,
said security processing unit further comprising:
one or more personal identification means (PIM) input units coupled to a system bus in an ICA, said PIM input units operable to generate unique PIM signals;
a security protocol circuit operable to encrypt, decrypt, store and retrieve said PIM signals and device driver code;
a PIM verification circuit, said PIM verification circuit operable to receive said PIM signals and compare them to secure predetermined PIM signals, said PIM verification circuit generating a verification signal;
one or more Modems coupled to a dialing action controller and to communication lines, said Modems operable to send and receive communication data;
a dialing action controller (DAC) coupled to said system bus and said Modems, said DAC operable to receive a dialing action request and to alert a user of said dialing action and to enable or disable said dialing action to said Modems in response to said verification signal and a user signal; and
wherein said DAC uses a built-in key escrow function to notify a trusted server of a current dynamic host configuration protocol (DHCP) assigned IP address along with a key indicating authenticity of transmission so that voice over IP services between devices and a web page server lookup may be performed in a DHCP environment without side-channel communication for call or web reference look-up.

28. The Internet appliance of claim 27, wherein a PIM input unit of said PIM input units comprises:
a smart card reader;
a biometric input unit;
a personal identification number input unit; and
a voice recognition input unit.

29. The Internet appliance of claim 27, wherein said Modem comprises:
a digital subscriber line (DSL) Modem.

30. The Internet appliance of claim 27, wherein a Modem of said Modems comprises:
a wireless cellular modem.

31. The Internet appliance of claim 27, wherein a Modem of said Modems comprises:
a wireless personal communication system (PCS) modem.

32. The Internet appliance of claim 27, wherein a Modem of said Modems comprises a cable Modem.

33. The Internet appliance of claim 27, wherein a Modem of said Modems comprises a public subscriber telephone network (PSTN) Modem.

34. The Internet appliance of claim 27, wherein said DAC alerts said user of a dialing action by display on a user display screen coupled to said IA.

35. The Internet appliance of claim 27, wherein said DAC retrieves a connectivity cost and alerts said user of a connectivity cost associated with a requested dialing action if said dialing action is authorized.

36. The Internet appliance of claim 27, wherein said user signal is a response by said user to a connectivity cost alert for said dialing action.

37. The Internet appliance of claim 27, wherein said user is given an option of communicating on an established communication link in response to an authorized and enabled dialing action using data encryption.

38. The Internet appliance of claim 27, wherein said dialing action request comprises:
entering a communication access number via a keyboard keypad, a virtual display keypad, or by clicking a "hot spot" on a Web page.

39. The Internet appliance of claim 27, wherein said connectivity cost alert notifies a user of an actual toll call cost for a communication link corresponding to said authorized and enabled dialing action.

40. The Internet appliance of claim 27, wherein said user is alerted of said dialing action whether said dialing action was initiated locally or remote by another user.

41. The Internet appliance of claim 27, wherein DAC monitors incoming communication access numbers and directs communication to a answering or recording device or forwards the communication to another communication link in response to comparing said incoming communication access numbers to a predetermined, stored communication access numbers list.

* * * * *